United States Patent
Folkvang

(10) Patent No.: US 8,425,777 B2
(45) Date of Patent: Apr. 23, 2013

(54) METHOD OF SEPARATING A MIXTURE, AND A PLANT FOR SEPARATING A MIXTURE COMPRISING WATER, OIL AND GAS

(75) Inventor: Jorn Folkvang, Stathelle (NO)

(73) Assignee: Schlumberger Norge AS, Stavanger (NO)

( * ) Notice: Subject to any disclaimer, the term of this patent is extended or adjusted under 35 U.S.C. 154(b) by 792 days.

(21) Appl. No.: 12/084,427

(22) PCT Filed: Nov. 3, 2006

(86) PCT No.: PCT/IB2006/054112
§ 371 (c)(1),
(2), (4) Date: Sep. 16, 2009

(87) PCT Pub. No.: WO2007/052236
PCT Pub. Date: May 10, 2007

(65) Prior Publication Data
US 2010/0006476 A1   Jan. 14, 2010

(30) Foreign Application Priority Data
Mar. 11, 2005 (EP) .................... 05388094

(51) Int. Cl.
*C10G 33/06* (2006.01)
(52) U.S. Cl.
USPC ........... 210/634; 208/187; 208/188; 516/143; 516/197; 95/253; 95/254; 95/259
(58) Field of Classification Search .......... 208/187–188; 516/143, 197; 210/634; 95/253–254, 259
See application file for complete search history.

(56) References Cited

U.S. PATENT DOCUMENTS

| 2,235,639 A | 3/1941 | Koch |
| 2,730,190 A | 1/1956 | Brown et al. |
| 4,752,399 A | 6/1988 | Viator et al. |

FOREIGN PATENT DOCUMENTS

| EP | 0 298 610 A2 | 1/1989 |
| EP | 0 963 228 | 12/1999 |
| EP | 1 335 784 B1 | 8/2004 |
| GB | 1 364 942 | 8/1974 |
| GB | 1 506 492 | 4/1978 |
| WO | WO 98/37941 | 9/1998 |
| WO | WO 02/41965 A2 | 5/2002 |

OTHER PUBLICATIONS

McCabe, W.L. et al. (1993). Unit Operations of Chemical Engineering, 5th McGraw-Hill, 1130 pgs. (Office action cites p. 262).*
Lopez O. et al (2009). Geochemica et Cosmochimica Acta, 73, 337-347.*
Bagnoli, E. et al. (1984). Psychometry, Evaporative Cooling, Refrigeration and Cryogenic Processes in Perry's Chemical Engineers' Handbook, 6th ed, McGraw-Hill (Office action cites pp. 12-42 & 12-46 therein).*

* cited by examiner

Primary Examiner — Brian McCaig
(74) Attorney, Agent, or Firm — Baker & Hostetler LLP

(57) ABSTRACT

A method of separating includes mixing a fluid into a mixture that has been separated from an oil well stream and that includes water, oil, and gas. The mixture including the fluid is fed into a separator and allowed to separate into a water phase and an oil/fluid phase. The cleaned water phase is removed from the separator via an outlet for water. The oil/fluid phase is subjected to a separation step separating the oil/fluid into an oil phase and a gaseous phase, from which gaseous phase the fluid is recovered by a condensation step and recycled for injection into the mixture. The separator is a liquid-liquid/gas separator in which the pressure is in the range of 0.5 bar to 25 bar, while the mixture including the fluid is separated into the water phase and an oil/gas phase.

16 Claims, 3 Drawing Sheets

METHOD OF SEPARATING A MIXTURE, AND A PLANT FOR SEPARATING A MIXTURE COMPRISING WATER, OIL AND GAS

CROSS-REFERENCE TO RELATED APPLICATION

This is a national stage of PCT/IB06/054112 filed Nov. 3, 2006 and published in English.

BACKGROUND OF THE INVENTION

1. Field of Invention

The present invention relates to a method of separating a mixture, which method comprises the steps of: mixing a fluid into the mixture; conducting the mixture comprising the fluid via an inlet duct into a separator; allowing the mixture comprising said fluid to separate in the separator into a water phase and an oil/fluid phase; removing the water phase from said separator via an outlet for water and the oil/fluid phase via at least one outlet for oil/fluid; and subjecting the oil/fluid phase to a separation step, separating the oil/fluid phase into an oil phase and a gaseous phase, from which gaseous phase the fluid is recovered by a condensation step and recycled for injection into the mixture.

2. Description of the Prior Art

A method of this kind is disclosed in GB 1 364 942 directed at deoiling and dewatering refinery sludges by use of light hydrocarbons. These sludges occur at oil refineries and comprise sediments in tanks, waste chemicals, emulsions, catalyst rust generated over years and water and oil. The refinery sludges are contacted with light hydrocarbons to obtain phase separation of oil from solids and water-solids phase. The separator acts on phases that are either solid or liquid, and the fluid added to the mixture is maintained in liquid state until the final separation step where the fluid is heated to a temperature in the range of 135-199° C. and allowed to separate from the oil in a fractionating tower. This method is requires a considerable amount of energy and is not suitable for mixtures having a high content of water.

EP 0 963 228 B1 discloses a process for extraction of dispersed and dissolved hydrocarbon contaminants from water. A fluid is injected into the water contaminated with hydrocarbons before the water is treated in a hydrocyclone. The fluid is a condensate from natural gas and is kept in liquid form during the process, so that the hydrocarbon and the fluid can form a single liquid phase. Consequently, the process has to be performed at high pressures of at least 30 bar or more. Compared with earlier processes the process disclosed in EP 0 963 228 B1 is capable of treating a large amount of contaminated water and is capable of cleaning the water to be discharged to have content of impurities not exceeding 40 ppm. And WO 98/37941 describes a process for simultaneously extraction of dispersed and dissolved hydrocarbon contaminants from water.

SUMMARY OF THE INVENTION

An object of the present invention is to provide a method and a plant in which the environment is relieved from release of oil without spending relatively large amounts of energy on the cleaning process.

With a view to this the method according to the invention is characterized in that the mixture has been separated from an oil well stream and comprises water, oil, and gas, that said separator is a liquid-liquid/gas separator in which the pressure is in the range of 0.5 bar to 25 bar while the mixture comprising said fluid is separated into said water phase and an oil/gas phase.

During oil and gas production the stream from the well comprises water, oil and gas, and the stream from the well is typically subjected to an initial separation process to separate it into an oil/gas phase and a mixture comprising water, oil and gas. The latter mixture, which has a high content of water and can contain up to e.g. 1500 ppm oil, cannot be released to the environment without being subjected to further separation or cleaning. The method of injecting a condensed fluid into the mixture in order to capture oil by a liquid-liquid blend of oil and fluid has turned out to be well suited for mixtures having high water contents. And the retrieval of the fluid for recirculation before the cleaned water is returned to the reservoir or sea is a clear environmental advantage both because the fluid is not released in larger amounts to the environment and because resources are not spent on adding new fluid. The present invention allows a cleaning of the produced water in oil and gas production to a level where the content of impurities in the form of oil is close to zero, or at least as low as 10 or 5 ppm.

Several advantages are obtained by using a liquid-liquid/gas separator in which the pressure is in the range of 0.5 bar to 25 bar. At least a significant portion of the condensed fluid added to the mixture becomes gaseous and released from the liquid phases in the liquid-liquid/gas separator. The portion of the fluid released as a gas in the liquid-liquid/gas separator needs no heating in order to be separated from the oil, and thus energy is saved in the oil/fluid phase separation step in comparison with the method disclosed in the prior art. The pressure in the range of 0.5 bar to 25 bar allows release of natural gas from the mixture and is furthermore of particular advantage when the fluid added to the mixture has been selected from the preferred $C_1$-$C_8$ hydrocarbons which have affinity to oil and may boil off from the mixture when the pressure in the liquid-liquid/gas separator is less than 25 bar. The water phase taken out from the outlet for water in the liquid-liquid/gas separator may easily contain less than 10 ppm or 5 ppm impurities, and it is possible to obtain a level below an upper limit for oil in the water of 1 ppm, and the method according to the present invention may even allow an upper limit for oil in the water as low as 0.01 ppm. In addition the method according to the present invention is a very cost-effective process that can also treat a large amount of water (mixture).

The liquid-liquid/gas separator may be a conventional gravity separator, a cyclone separator or compact flotation unit. The efficiency of such separators is highly improved when used in the method according to the invention. A preferred liquid-liquid/gas separator for use according to the invention is a combined degassing and flotation tank as disclosed in EP 1335784 B1.

Preferably the fluid is a $C_1$-$C_8$ hydrocarbon, viz. a $C_1$, $C_2$, $C_3$, $C_4$, $C_5$, $C_6$, $C_7$, or $C_8$ hydrocarbon. The fluid is mixed or injected into the mixture comprising water, oil, and gas, upstream of and preferably in the inlet duct for the liquid-liquid/gas separator. The fluid selected from $C_1$-$C_8$ gases having affinity for oil and gas is injected and/or mixed into the mixture comprising water, oil and gas and absorbs hydrocarbon from the water phase. In the liquid-liquid/gas separator the fluid is released as a gas, mainly in the form of tiny bobbles which due to their affinity for the oil and gas facilitate and improve the separation of the oil/gas from the water by flotation. A minor part of the fluid may remain in liquid form included in the oil/gas phase.

Although the fluid can be any $C_1$-$C_8$, methane, ethane, propane, butane, pentane, hexane, septane and octane including iso-butane and iso-pentane, etc, or mixtures thereof, it is preferred that the fluid is a $C_5$ gas, pentane or iso-pentane or hexane. These latter, preferred fluids are condensable by use of sea water as coolant, and this is a distinct advantage in view of saving of energy when the water cleaning is performed in areas where sea water is freely available.

In order to facilitate and improve the separation of the water phase and the oil/gas phase the fluid is added in an amount of 0.02-1.8 St. $m^3$ gas phase per $m^3$ of the mixture, and more preferably in an amount of 0.05-1.4 St. $m^3$ gas phase per $m^3$ of the mixture. Prior to the mixing the gas phase is condensed, cooled and/or compressed into liquid state. On liquid basis the fluid is preferably added in an amount of 0.5 to 2 weight-% of the liquid mixture. In connection with the present invention the dimension St. $m^3$ is used as the volumetric unit of gaseous medium in relation to the volume of mixture. St. $m^3$ is standard cubic meters of the gaseous medium. St. $m^3$ is standardised within the offshore field (volume of dry gas at 15.6° C. and a pressure of 101.325 kPa). The pressure in the liquid-liquid/gas separator is in the range 0.5 to 25 bar, and preferably in the range 1.0 to 15 bar.

The fluid is recovered and recycled. Recovery of the fluid may be obtained by distillation of the oil/gas phase which will typically result in a liquid phase comprising heavier hydrocarbons (approximately $C_6$ and upwards) and a gaseous phase comprising lighter hydrocarbons ($C_5$ and lighter). The gaseous phase is then subsequently subjected to a condensation process to condense Cs constituents. When the method is used offshore or onshore near the sea it is favourable to use pentane as the fluid as the condensation may use seawater as cooling agent. Seawater normally has a temperature of e.g. approximately 2-18° C., suitable 5-15° C., which corresponds to the condensation temperature of pentane at low pressures below 15 bar, preferably below 10 bar. Thus, condensation of $C_5$ in the condensation vessel can be controlled by adjusting pressure in relation to the temperature of the seawater used as cooling agent. Thereby, a cost-effective condensation of the fluid can be established and a purity of the $C_5$ fluid of more than 99% can be achieved. As the skilled person will very easily recognize such adjustment of pressure in relation to temperature is also possible when utilizing $C_1$-$C_4$ or $C_6$-$C_8$ as the fluid. However, the overall energy consumption will then be at least slightly higher than for $C_5$.

According to the invention a very efficient loop of the fluid can be established wherein the fluid is injected into the mixture comprising water, oil and gas to facilitate the separation of water phase and oil/gas, phase, and subsequently the fluid is recovered from the oil/gas phase and recycled.

According to an example of the present method, the gas comprised in the mixture is natural gas. Natural gas is a normal constituent from an oil well.

In a further preferred embodiment of the method according to the invention it may be desirable to mix and/or inject a further gas into the mixture comprising water, oil, and gas in the inlet duct to obtain even better separation, preferably the further gas is natural gas or nitrogen. The further gas may, at least partly, be a gas recovered from the mixture comprising water, oil, and gas, and recycled for injection into the mixture.

In a further aspect the present invention relates to a plant for separating a mixture comprising water, oil, and gas, which plant comprises at least one liquid-liquid/gas separator with an inlet duct for the mixture comprising water, oil, and gas; an outlet for water; and an outlet for oil/gas; which inlet duct comprises means for injecting and/or mixing a fluid into the mixture comprising water, oil and gas, an oil/gas separator receiving the oil/gas fraction from said outlet for oil/gas, a condensation vessel for recovering the fluid, which condensation vessel receives a gaseous fraction from the oil/gas separator and is provided with seawater as cooling agent, and a pump for recycling condensed fluid to the inlet duct of the liquid-liquid/gas separator.

The plant provides the advantages as mentioned in the above in connection with the method according to the present invention and it has very high separation efficiency, i.e. the water purified in the plant has a very low content of oil impurities, if any, when leaving the liquid-liquid/gas separator. The fluid in liquid form in the inlet duct will absorb the oil in the water and tiny bubbles of the fluid in gaseous form in the separator will enhance the separation of oil and gas from the water, thereby obtaining water of very high purity. And the recovery of the fluid provides for a very cost-effective operation of the plant. The plant is preferably located offshore or near the sea, and the condensation vessel is adapted to utilize seawater as a cooling agent. In this manner a very cost-effective condensation is achieved. The condensed fluid is led back and injected into the mixture to be separated in the plant. Thus, the plant according to the invention comprises means for re-circulating the fluid.

In a preferred embodiment of the plant according to the invention the means for injecting and/or mixing is an annularly or ring shaped mixer with nozzle openings on the interior surface of the ring. Such a mixer provides good mixing of the fluid into the mixture in the inlet duct. The injector or mixer may comprise one or more nozzles for injecting the fluid into the mixture on the interior side of the mixer.

In order to obtain a high efficiency it is preferred that the fluid is a $C_1$ to $C_8$ hydrocarbon, preferably a $C_5$ hydrocarbon which has a very good affinity and miscibility with the oil fraction in the mixture.

Preferably the plant comprises an additional separator as recovery means for separating the oil/gas phase (optionally comprising a minor amount of water) rejected from the separator into an oil phase (optionally comprising a minor amount of water) and a gas phase. The additional separator is preferably a distillation apparatus. A distillation apparatus is suitable for separating a mixture into fractions having specific densities or molar weights. The light fraction will leave the distillation apparatus in gaseous form and the heavier fraction will leave the distillation apparatus in liquid form. Thus, the fluid and gas from the mixture will leave the distillation apparatus in gaseous form, while the oil and optional residual water will leave the distillation apparatus in liquid form.

In a preferred embodiment the plant comprises further recovery means for the fluid in form of a condensation vessel. Consequently, the gas leaving the distillation apparatus is lead to the condensation vessel wherein the temperature and pressure conditions are set in such a way that the fluid condenses, and the remaining, different gasses supplied by the mixture itself leave the condenser as gas. In case of pentane it is possible to obtain more than 99% pure pentane as condensate product from the condensation vessel. In order to further improve the separation in the plant according to the invention it is preferred that the inlet duct comprises means for injecting a further gas into the mixture comprising water, oil, and gas. This will improve the separation capacity of the liquid-liquid/gas separator. The further gas is preferably selected from natural gas, nitrogen or carbon dioxide.

The invention also relates to use of $C_5$ hydrocarbons for separating a mixture comprising water, oil and gas in an oil producing plant. In particular the invention relates to use in which the $C_5$ hydrocarbons is recovered and recycled into the mixture comprising water, oil and gas.

BRIEF DESCRIPTION OF THE DRAWINGS

Embodiments and examples of the present invention will now be explained in further detail with reference to the highly schematic drawings in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

In the context of the present invention the term mixture comprising water, oil and gas generally refers to a liquid/gas mixture from an oil well in which a first separation of water from oil and gas in one or more steps have typically taken place, and the water fraction from such a separation requires a further cleaning or separation before the water is sufficiently clean for disposal. The mixture may comprise impurities like oil, gas, and even sand and clay.

A liquid-liquid/gas separator 3 is a separator capable of separating two liquids that are substantially immiscible and have different densities (i.e. heavy liquid is water and light liquid is oil) where the gas is substantially dispersed as tiny bubbles in the liquids. The gas primarily leaves the separator with the light liquid (the oil). This relationship is expressed as the oil/gas phase or the oil/fluid phase.

The water phase leaving the liquid-liquid/gas separator may contain traces of oil and gas, just as the oil/gas phase leaving the liquid-liquid/gas separator may contain water (in normal conditions the reject in form of the oil/gas phase may contain 20-80 weight-% water). The reject in form of the oil/gas phase typically constitutes from 0.1 to 5% by weight of the inflowing mixture, preferably less than 2% by weight of the inflowing mixture in the inlet to the liquid-liquid/gas separator 3.

Figure 3:
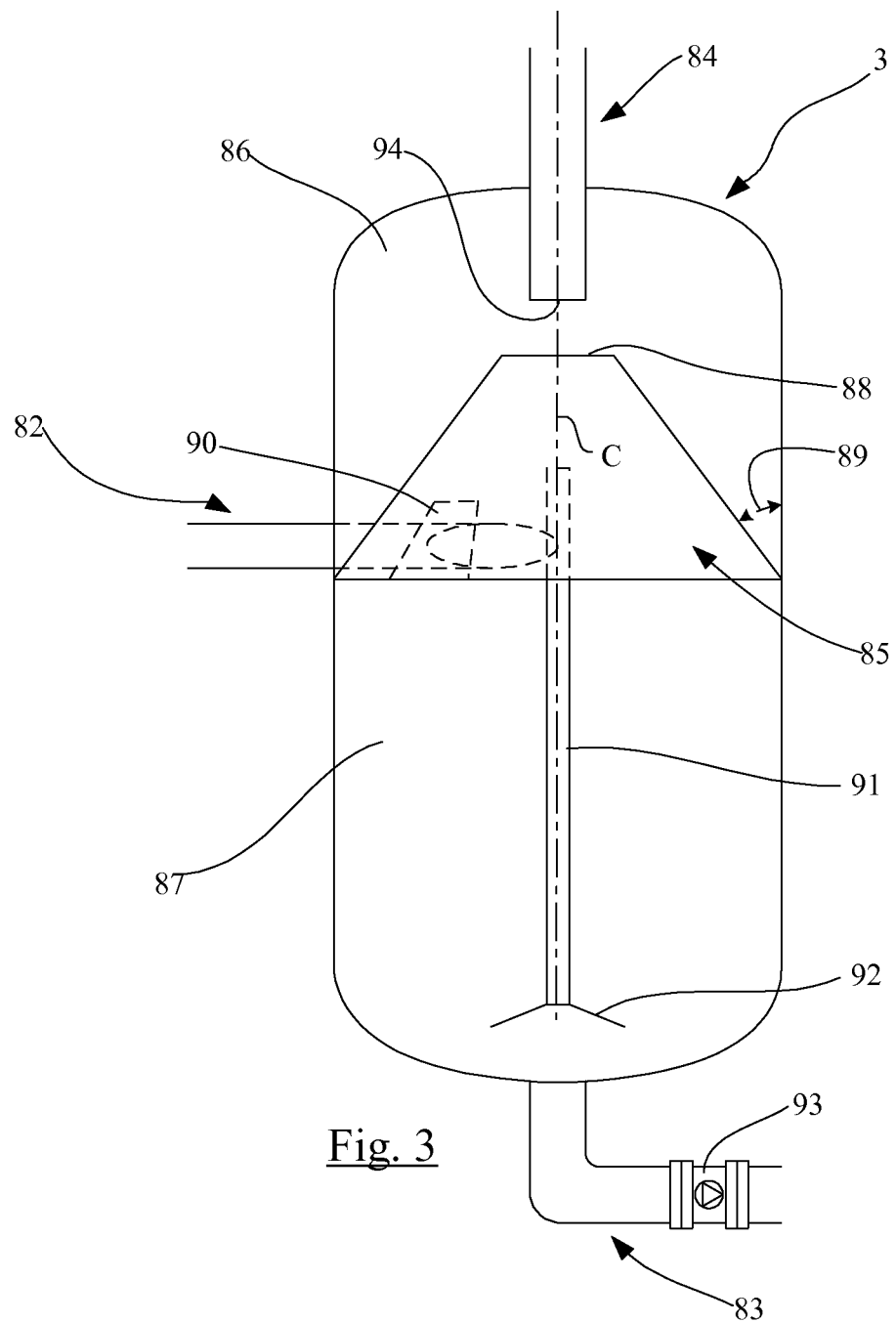
FIG. 3 illustrates an embodiment of a liquid-liquid/gas separator.

The liquid-liquid/gas separator 3 may be of a design as disclosed in WO 02/041965 which is hereby incorporated into the present disclosure by reference, or it may be of a design as illustrated in FIG. 3 or it may be of another suitable design.

The fluid for injection is preferably a $C_1$-$C_8$ hydrocarbon or mixtures thereof, most preferably a $C_5$ hydrocarbon. The fluid may be present and utilized in liquid or gaseous form depending on pressure and temperature. It has appeared to be an advantage to use $C_1$-$C_8$ hydrocarbons as separation aids, as these hydrocarbons have a very good affinity for oil and can relatively easily change phase from liquid to gas and vice versa (with relatively small changes in pressure and temperature and thus a relatively small consumption of energy).

Figure 1:
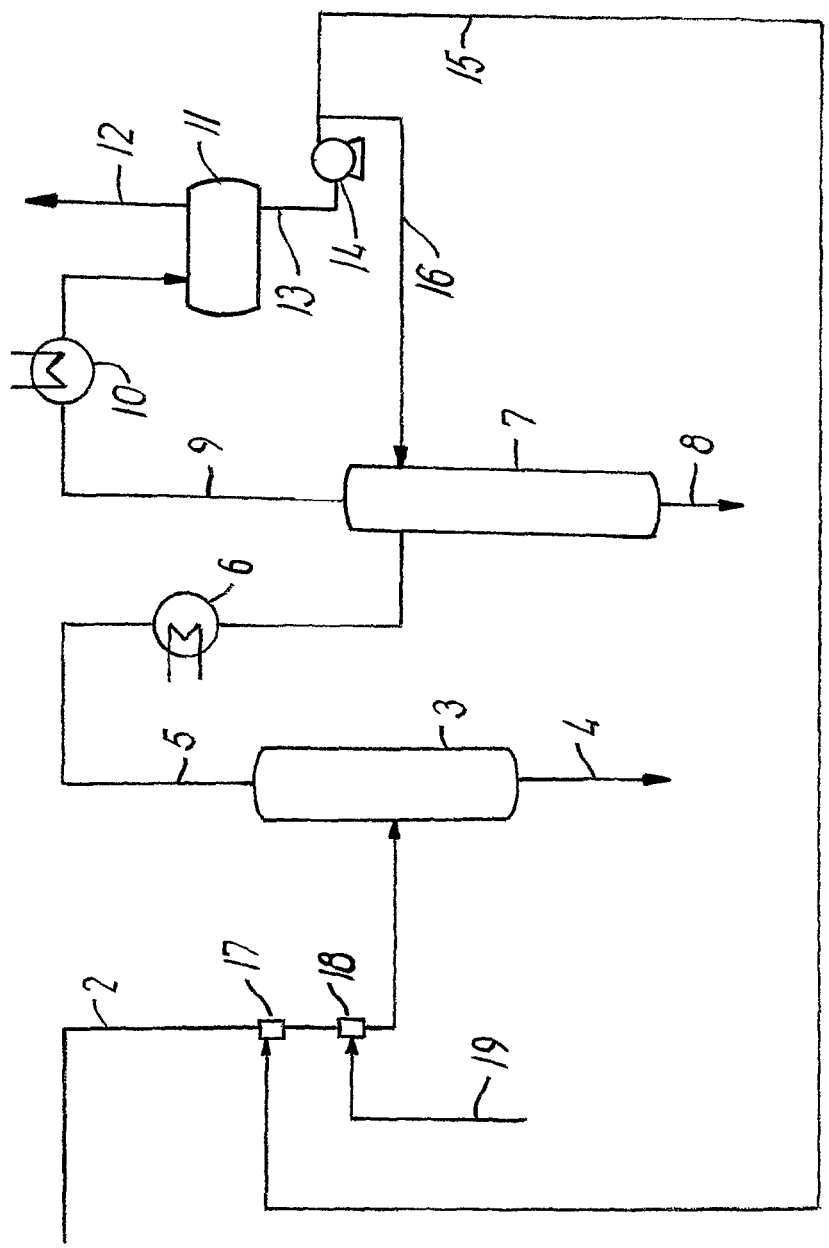
FIG. 1 shows a principle diagram of a method according to the present invention.

In FIG. 1 a schematical flow sheet of a plant 1 according to the invention is depicted wherein the incoming product stream in form of the mixture comprising water, oil and gas is lead to a liquid-liquid/gas separator 3 via line 2. In the separator 3 the incoming stream is separated into a water fraction and an oil/gas fraction (optionally comprising a minor amount of water), which is taken out from the separator 3. The water fraction from the separator is taken out at the bottom of the separator 3 via line 4.

The oil/gas fraction is taken out at the top of the separator 3 via line 5. The oil/gas fraction in line 5 is cooled during passage by a first heat-exchanger 6 before entering the distillation apparatus 7. In the distillation apparatus 7 the oil/gas fraction is separated into a light fraction and a heavy fraction. The heavy fraction (including oil and optionally water) leaves the distillation apparatus 7 via line 8, and the light fraction (including $C_5$) leaves the distillation apparatus via line 9. The light fraction, which is substantially gaseous, is cooled by a second heat-exchanger 10 before entering the condensation-vessel 11.

In the condensation vessel 11 the heavier part of the fraction condense as a liquid, while the lighter fraction remains in gaseous form and leaves the condenser 11 via line 12. The condensed part is taken out at the bottom of the condenser 11 via line 13.

The condensed liquid is pressurized in the pump 14 and is returned via line 15 for injection into the incoming stream in line 2 as fluid substantially in liquid form. When the mixture enters the separator 3 the fluid becomes substantially gaseous due to release of pressure (pressure and temperature in the separator 3 is adjusted to ensure this). A part of the condensed liquid in line 15 is recycled back to the distillation apparatus via line 16. The product or fluid from the condenser 11 is injected into the incoming stream by the injector 17.

Further an additional gas may be injected into the incoming stream via injector 18 fed by line 19, e.g. fuel gas or nitrogen.

For reasons of clarity, valves, pressure sensors, and other equipment which presence is evident for the skilled person have been excluded.

Figure 2:
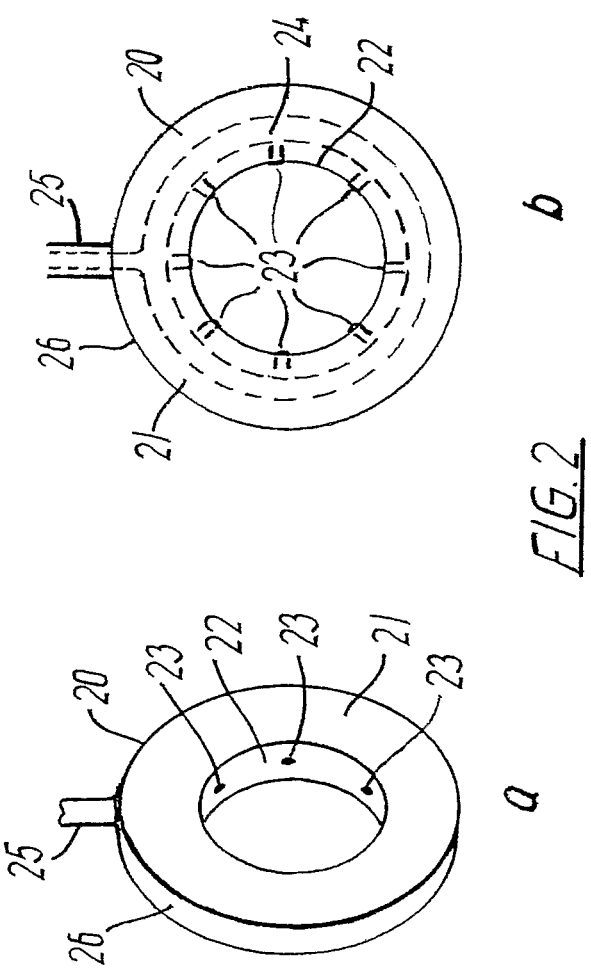
FIGS. 2a and 2b illustrate an embodiment of a gas injector suitable for use according to the invention.

FIGS. 2a and 2b show a nozzle device 20 suitable for use in the invention. The nozzle device consists substantially of an annular flange 21. The inner peripheral surface 22 of the flange 21 is equipped with a number of holes 23 (in this embodiment six holes 23). The holes 23 communicate with a channel 24 within the flange 21 (the channel 24 is shown with dotted lines in FIG. 2 b). The channel 24 further communicates with a supply line 25 for the gaseous medium, which is fastened to the outer peripheral surface 26 of the flange 21. The nozzle device 20 is capable of providing a good mix of the mixture and the gaseous medium in the inlet line 2 (FIG. 1).

FIG. 3 illustrates another embodiment of the liquid-liquid/gas separator 3 in the plant and method according to the present invention. A substantial cylindrical tank has a tangentially arranged inlet 82 for mixture comprising water, oil and gas. Inlet 82 extends to an inlet opening in the wall of the tank. The separator 3 further comprises an outlet 84 for an oil/gas fraction at the top of the tank and communication with line 5, and an outlet 83 for water at the bottom of the tank. Outlet 84 is typically for fluid having less density than the fluid taken out through outlet 83.

Just below the level of the inlet 82 is attached a conical frusta shaped wall 85 which protrudes upwards and divides the tank into an upper part 86 and a lower part 87. The upward protruding conical frusta shaped wall 85 has a first opening 88 at the upper end to allow communication between the upper 86 and lower part 87 of the separator 3. The angle indicated with curved arrow 89, between the vertical sidewall of the tank and the upper side of conical frusta shaped wall 85 is in the range between 15° and 70°, preferably between 20 and 50°. This express the inclination of the conical frusta shaped wall 85.

The conical frusta shaped wall 85 is besides the first opening 88 equipped with a second opening 90 at the level of the inlet 82. As shown the second opening 90 is located in the conical frusta shaped wall 85 in such a way that a liquid coming into the separator tank from the inlet 82 will rotate about 300° around the upper part of the conical frusta shaped wall 85 in the upper part 86 of the tank before passing through the second opening 90 into the lower part of the tank 87.

The tangential inlet 82 in combination with the cylindrical wall of the tank provides for a formation of a vortex flow in the upper part of the tank and of a vortex flow in the lower part of the tank. However, the vortex flow may form a vortex eye in the centre of the tank which eye is free of liquid mixture. The formation of a vortex eye is undesired due decreased capacity. It has appeared than the formation of a vortex eye can be avoided by placing an elongated member, such as a vertically extending rod 91 in the centre of the tank. The rod 91 extends approximately ⅔ of the tank height into the tank from the bottom area of the tank where the rod is attached to a conical member 92 that covers the second outlet 83, when viewed from above, and thus is a means for calming a stream around the second outlet. The conical member 92 may e.g. be attached to the wall of the tank by use of two or more flat bars. Also rod 91 can be attached to the wall of the tank or to the conical frusta shaped wall 85 by several flat bars or other supporting or bracing members, such as round metal. The second outlet 83 may be equipped with a valve 93. By adjusting this valve 93 the pressure build-up by gas released from the mixture in the tank can be adjusted. The gas released from the mixture is collected in the upper part 86 of the tank. When the collected gas has displaced the liquid mixture to a level below an outlet opening 94 to the outlet 84, gas and oil are ejected out of the tank via outlet 84 due to gas pressure.

The plant and the method according to the present invention can be modified within the scope of the appended patent claims. Details of the various embodiments can be combined into new embodiments within the scope of the patent claims. It is e.g. possible to provide an individual tank with two or more outlets for water and/or with two or more outlets for oil/gas and/or with two or more inlets for mixture or recirculated mixture, if mixture is recirculated. The individual outlet can be provided with a valve.

Example 1

The invention was tested in a plant corresponding to the plant depicted in FIG. 1.

The incoming stream of polluted water (i.e., via line 2 in FIG. 1) amounts to 10 m$^3$/h with an oil concentration of 30 ppm. In the inlet duct leading to the liquid-liquid/gas separator (3 in FIG. 1; corresponding to the combined degassing and flotation tank disclosed in EP 1335784 B1) the incoming stream is injected with 300 kg/h of the fluid, such as pentane.

In the liquid-liquid/gas separator the incoming stream is separated into a substantially pure water stream (oil in water less than 1 ppm), which is taken out from the bottom of the separator. From the top of the separator is a stream comprising oil and fluid primarily as gas with some water taken out (oil/gas approx. 320 kg/h, water approx. 195 kg/h).

The latter stream is cooled and sent to a distillation apparatus (a stripper, 7 in FIG. 1). From the bottom of the distillation apparatus a liquid fraction comprising water and a minor amount of gas and oil is taken out. From the top of the distillation apparatus a gaseous stream comprising the fluid, such as pentane, and minor amounts of water and heavier hydrocarbons is taken out.

The gaseous stream is further cooled and fed to the condensation vessel (11 in FIG. 1) in which the fluid, such as pentane condenses and is taken out for recycling.

As it can be seen from Table 1 a highly efficient cleaning of water combined with an almost complete recycling of the fluid, such as pentane (loss less than 0.5% per hour) is achieved.

TABLE 1

Water cleaning according to the invention.

| | | |
|---|---|---|
| Loss pentane | 1.3 | kg/h |
| Produced water | 10.0 | m$^3$/h |
| Extraction fluid | 300.0 | kg/h |
| Flotation gas | 3.0 | Sm$^3$/h |
| Oil in water in | 30.0 | Ppm |
| Oil in water out | Less than 1.0 | Ppm |

Example 2

In a plant as depicted in FIG. 1, a stream of water in mixture with oil and gas has been separated off from an oil well stream, and the water rich mixture is fed to line 2 at a flow rate of 200 m$^3$/h and a temperature of about 65° C. and a pressure of 2.5 bar. The mixture is sampled and checked for contents of oil at intervals, and the content of oil is about 25 ppm.

Injector 17 mounted in line 2 is via line 15 supplied with pentane at a flow rate of 3000 kg/h at a pressure of 5 bar and a temperature of about 75° C., and the pentane is injected into and thus mixed with the mixture.

The mixture continues its flow through line 2 and passes through the inlet duct to the liquid-liquid/gas separator 3 where the pressure drops somewhat to about 2.0 bar which causes the pentane to be released from the mixture in gaseous state. The liquid-liquid/gas separator separates the mixture into a stream of cleaned water taken out through line 4 at the bottom of separator 3 at a flow rate of 194 m$^3$/h. The stream of cleaned water is sampled at regular intervals and the average content of oil is measured to less than 0.03 ppm.

Through an outlet at the top of separator 3 a stream of reject flows through line 5 at a flow rate of about 9000 kg/h and a pressure of about 2 bar. The composition of this flow is water with 3000 kg/h of pentane in mainly gaseous condition and about 5 kg/h of oil, about 1400 kg/h of natural gas from the mixture supplied to line 2 and a balance of water. The stream in line 5 flows through heat-exchanger 6, which is cooled with seawater at a temperature of about 14° C. The flow is cooled and pentane condenses in the heat-exchanger, and on the downstream side of the heat-exchanger the flow continues through line 5 at a pressure of about 0.5 bar and a temperature of about 20 to 25° C.

Line 5 delivers the stream to the inlet opening in distillation apparatus 7 in which pentane and hydrocarbons lighter than pentane are stripped from the liquid by evaporation and leaves apparatus 7 as a gaseous stream through an outlet to line 9. From the bottom of the distillation apparatus a liquid fraction comprising water and oil and possible hydrocarbons heavier than pentane is taken out at a flow rate of about 4600 kg/h.

The gaseous stream flows through line 9 at a flow rate of about 5900 kg/h to the second heat-exchanger 10, which is cooled with seawater at a temperature of about 14° C. The gaseous stream is cooled to just below the condensation temperature of pentane, and the resulting flow of liquid/gas is supplied to vessel 11. In vessel 11 the hydrocarbons lighter than pentane leaves the vessel through an outlet to line 12, and liquid pentane is taken out through line 13 from the bottom of vessel 11 at a flow rate of about 4500 kg/h.

Line 13 delivers the flow of pentane to pump 14 which delivers the stream of pentane at a pressure of about 5 bar. The pump supplies pentane to injector 17 via line 15 at a flow rate of about 3000 kg/h, and line 16 provides a reflux flow of pentane to distillation apparatus 7 at a flow rate of about 1500 kg/h. Line 16 is provided with a means for pressure reduction and flow control.

It is obvious that the above examples are non-limiting and that the flow rates, pressures and temperatures are adapted to the actual conditions at hand. The mixture delivered to line 2 will vary in composition, temperature and pressure over time, and from one application to another. For a given well head and a given installation of processing equipment the conditions will vary with variations in the well head flow taken out from the reservoir, and also the temperatures and pressures in the flows and in the cooling media, like sea water, will vary with the season. And from one production facility to another there can be considerable variations in composition, amount and temperature of e.g. the mixture delivered to line 2. It is within the skills of the ordinary practitioner to select the processing parameters relevant to the particular application on the basis of the above description of the present invention. To give one example, if the temperature in the mixture supplied to line 2 is considerably lower than in Example 2, and the pressure slightly higher, then it can be appropriate to select e.g. butane as the fluid for injection into the mixture, and if the temperature is higher e.g. pentane or hexane can be selected. The pressures used are adapted to the relevant temperatures so that the fluid leaves separator 3 in mainly gaseous state, and it is without further explanation possible to adapt e.g. the temperature and/or pressure in distiller (i.e., distillation apparatus) 7 so that the fluid evaporates in the distiller. And as mentioned in the above, additional agents can be added to the mixture upstream of separator 3 with a view to enhancing the separation process in the separator.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A method of separating oil/gas from a mixture of water, oil, and gas, which mixture in an initial separation process has been separated from an oil/gas phase, said method comprising the steps of:
    mixing a fluid into the mixture;
    conducting the mixture including the fluid via an inlet duct into a first separator;
    allowing the mixture including the fluid to separate in the first separator into a water phase and an oil/fluid phase, the first separator being a liquid-liquid/gas separator having a pressure is in a range of from 0.5 bar to 25 bar;
    removing the water phase from the first separator via an outlet for water and the oil/fluid phase via at least one outlet for oil/fluid; and
    subjecting the oil/fluid phase to a second separation step that includes separating the oil/fluid phase into an oil phase and a gaseous phase, from which gaseous phase the fluid is recovered in a condensation vessel and is recycled for injection into the mixture,
    the fluid being a $C_5$ hydrocarbon, pentane, iso-pentane, or hexane, and the condensation vessel being in fluid communication with sea water, with the sea water acting as a coolant in the condensation vessel.

2. The method according to claim 1, wherein the second separation step is distillation.

3. The method according to claim 1, wherein said fluid is mixed into the mixture of water comprising oil, and gas in the inlet duct for the liquid-liquid/gas separator.

4. The method according to claim 1, wherein the fluid is added in an amount of 0.02-1.8 St. $m^3$ per $m^3$ of the mixture.

5. The method according to claim 1, wherein the fluid is added in an amount of 0.05-1.4 St. $m^3$ per $m^3$ of the mixture.

6. The method according to claim 1, wherein the fluid is added in an amount of 0.5 to 2 weight-% of the mixture.

7. The method according to claim 1, wherein the pressure in the liquid-liquid/gas separator is in the range of from 1.0 to 15 bar.

8. The method according to claim 1, wherein the gas in the mixture is natural gas.

9. The method according to claim 1, wherein another gas is mixed into the mixture of water comprising oil, and gas in said inlet duct.

10. The method according to claim 9, wherein said another gas is natural gas or nitrogen.

11. The method according to claim 9, wherein at least a portion of the another gas is gas recovered from the mixture of water comprising oil, and gas.

12. A plant for separating a mixture of water including oil, and gas in accordance with claim 1, said plant comprising:
    at least one liquid-liquid/gas separator with an inlet duct for the mixture including water, oil, and gas, the inlet duct including an element for injecting and/or mixing a fluid into the mixture of water including oil, and gas; an outlet for water; and an outlet for oil/gas;
    an oil/gas separator for receiving an oil/gas fraction from said outlet for oil/gas;
    a condensation vessel for recovering the fluid, the condensation vessel receiving a gaseous fraction from the oil/gas separator and being in fluid communication with sea water, with the sea water acting as a coolant therein; and
    a pump for recycling condensed fluid to the inlet duct of the liquid-liquid/gas separator,
    the fluid being a $C_5$ hydrocarbon, pentane, iso-pentane, or hexane.

13. The plant according to claim 12, wherein the element for injecting and/or mixing is an annularly shaped mixer.

14. The plant according to claim 12, wherein the oil/gas separator is a distillation apparatus.

15. The plant according to claim 12, wherein the inlet duct includes an element for injecting another gas into the mixture of water comprising oil, and gas.

16. A plant for separating a mixture of water including oil, and gas in accordance with claim 1, said plant comprising:
    at least one liquid-liquid/gas separator with an inlet duct for the mixture including water, oil, and gas, the inlet duct including an injector or mixer with openings or nozzles for adding a fluid to the mixture of water comprising oil, and gas; an outlet for water; and an outlet for oil/gas;
    an oil/gas separator for receiving an oil/gas fraction from the outlet for oil/gas;
    a condensation vessel for recovering the fluid, the condensation vessel receiving a gaseous fraction from the oil/gas separator and being in fluid communication with sea water, with the sea water acting as a coolant therein; and
    a pump for recycling condensed fluid to the inlet duct of the liquid-liquid/gas separator,
    the fluid being a $C_5$ hydrocarbon, pentane, iso-pentane, or hexane.

* * * * *